(12) United States Patent
Gherardi

(10) Patent No.: US 10,704,342 B2
(45) Date of Patent: Jul. 7, 2020

(54) HYDRAULIC ACTUATOR WITH INTEGRAL TORQUE TURN MONITORING

(71) Applicant: 2M-TEK, Inc., Lafayette, LA (US)

(72) Inventor: Andrew Gherardi, Lafayette, LA (US)

(73) Assignee: 2M-TEK, Inc., Lafayette, LA (US)

( * ) Notice: Subject to any disclaimer, the term of this patent is extended or adjusted under 35 U.S.C. 154(b) by 0 days.

(21) Appl. No.: 16/151,680

(22) Filed: Oct. 4, 2018

(65) Prior Publication Data

US 2019/0352978 A1    Nov. 21, 2019

Related U.S. Application Data

(60) Provisional application No. 62/674,154, filed on May 21, 2018.

(51) Int. Cl.
| | | |
|---|---|---|
| *E21B 19/07* | (2006.01) | |
| *G01L 3/10* | (2006.01) | |
| *E21B 19/16* | (2006.01) | |
| *G01L 5/12* | (2006.01) | |

(52) U.S. Cl.
CPC .............. *E21B 19/07* (2013.01); *E21B 19/16* (2013.01); *G01L 3/108* (2013.01); *G01L 5/12* (2013.01)

(58) Field of Classification Search
CPC ......... E21B 19/07; E21B 19/16; G01L 3/108; G01L 5/12
See application file for complete search history.

(56) References Cited

U.S. PATENT DOCUMENTS

| | | | |
|---|---|---|---|
| 9,797,207 B2* | 10/2017 | McIntosh | E21B 19/06 |
| 2009/0071645 A1 | 3/2009 | Kension et al. | |
| 2011/0016964 A1 | 1/2011 | Strom | |
| 2013/0008647 A1 | 1/2013 | Dirksen et al. | |
| 2016/0177639 A1 | 6/2016 | McIntosh et al. | |
| 2016/0215592 A1* | 7/2016 | Helms | E21B 19/16 |
| 2018/0003039 A1 | 1/2018 | Nguyen et al. | |

OTHER PUBLICATIONS

Int'l Search Report & Written Opinion (PCT/US2018/031028), dated Jul. 9, 2019.
Int'l Search Report & Written Opinion (PCT/US2019/031028), dated Jul. 9, 2019.

* cited by examiner

*Primary Examiner* — David J Bagnell
*Assistant Examiner* — Jonathan Malikasim
(74) *Attorney, Agent, or Firm* — Gregory L. Porter; Hunton Andrews Kurth LLP

(57) ABSTRACT

An actuator assembly with integrated torque turn monitoring is described. Embodiments include a rotationally fixed outer hydraulic section and a rotationally independent inner hydraulic section which incorporates torque load sensors, axial load sensors, and rotational speed sensors directly into the inner hydraulic section. The inner hydraulic section is coupled to an outer cage by a cage ring and is axially movable relative to the inner mandrel. Upper and lower fluid chambers are disposed between the outer housing assembly and the inner mandrel. Fluid pumped through a lower pressure port into the lower chamber moves the housing assembly in a first direction, and fluid pumped through an upper pressure port into the upper fluid chamber moves the housing assembly in a second direction.

10 Claims, 4 Drawing Sheets

HYDRAULIC ACTUATOR WITH INTEGRAL TORQUE TURN MONITORING

CROSS REFERENCE TO RELATED APPLICATIONS

The present application claims priority from U.S. Ser. No. 62/674,154 filed on May 21, 2018, the entire disclosures of which are incorporated herein by reference. This application is also related to International Application PCT/US2017/018261 filed Feb. 17, 2017, the entire disclosure of which is incorporated herein by reference.

FIELD

Embodiments disclosed herein relate to an improved hydraulic actuator with integrated torque turn monitoring capability.

BACKGROUND AND SUMMARY

In the construction of oil or gas wells it is usually necessary to line the wellbore with a string of steel pipes commonly known as a "tubular" or tubing or generically as oil country tubular goods ("OCTG"). Because of the length of the tubular string required, individual sections of tubular are typically progressively added to the string in the wellbore as it is lowered into a well from a drilling rig or platform. The section to be added is restrained from falling into the well by some tubular engagement means, typically a spider. The section is then lowered into the well to position the threaded pin of the tubular to be added adjacent to the threaded box and/or female end of the tubular already in the wellbore. The two sections are then joined by relative rotation of the sections. This process may be repeated until such time as the desired total length of the tubular string has been achieved.

In one aspect, embodiments disclosed herein relate to a hydraulic actuator with integrated torque turn monitoring features disposed within the actuator assembly. Some embodiments include an outer hydraulic section which is rotationally fixed and an inner hydraulic section at an upper end with integrated torque turn monitoring features disposed within the inner hydraulic section. Certain embodiments additionally include a gripping apparatus, actuated by the inner hydraulic section at a lower end. The gripping apparatus includes an outer cage concentrically disposed about an inner mandrel. The outer cage is axially movable relative to the inner mandrel for engaging and disengaging a tubular with a plurality of rolling supports. The actuator assembly includes an inner hydraulic section which is coupled to the outer cage. The inner hydraulic section is axially movable relative to the inner mandrel. An upper fluid chamber is disposed between the inner hydraulic section and the inner mandrel, and a lower fluid chamber is disposed between the inner hydraulic section and the inner mandrel. Fluid pumped through a lower pressure port into the lower chamber moves the inner hydraulic section in a direction thereby causing the gripping apparatus to engage the tubular. Fluid pumped through an upper pressure port into the upper fluid chamber moves the inner hydraulic section in the opposite direction thereby causing the gripping apparatus to disengage the tubular. The integrated torque turn monitoring features measure the axial load and/or torque load during connection makeup and down hole rotation as well as the number of rotations and rotational speed of the tubular. The integrated torque turn actuator comprises a sensor to measure axial load and/or torque load during connection make up, break out, and down hole rotation and/or a gyroscopic sensor for measuring number of rotations and rotational speed. Certain embodiments may also comprise a positional sensor for measuring the absolute degrees of rotation over time. Axial load and/or torque load measuring devices include, but are not limited to, mechanical, rotating, foil, diffused semiconductor, and/or thin film strain gauges, as well as stationary proximity, magnetostrictive, and/or magnetoelastic sensors. Rotational speed sensors typically include a gyroscope.

In another aspect, embodiments disclosed herein relate to a method of monitoring torque load while operating a hydraulic actuator including a gripping apparatus. The gripping apparatus includes an outer cage concentrically disposed about an inner mandrel and axially movable relative to the inner mandrel for engaging and disengaging a plurality of rolling supports with a tubular. The method includes providing an actuator assembly with a rotationally fixed outer hydraulic section and a rotationally independent inner hydraulic section for moving the outer cage, the inner hydraulic section being coupled to the outer cage, and an upper fluid chamber defined between the inner hydraulic section and the inner mandrel, and a lower fluid chamber defined between the inner hydraulic section and the inner mandrel. In some embodiments, the inner hydraulic section is sealably engaged with the outer hydraulic section using a bearing. Due to the arrangement of upper and lower fluid chambers, the inner and outer hydraulic sections are axially fixed to each other, thereby preventing the bearing from being exposed to significant axial forces and extending the life of the bearing. The method further includes pumping fluid into the lower chamber and moving the inner hydraulic section and outer cage axially relative to the inner mandrel, thereby causing the gripping apparatus to engage the tubular.

DETAILED DESCRIPTION

Figure 1:
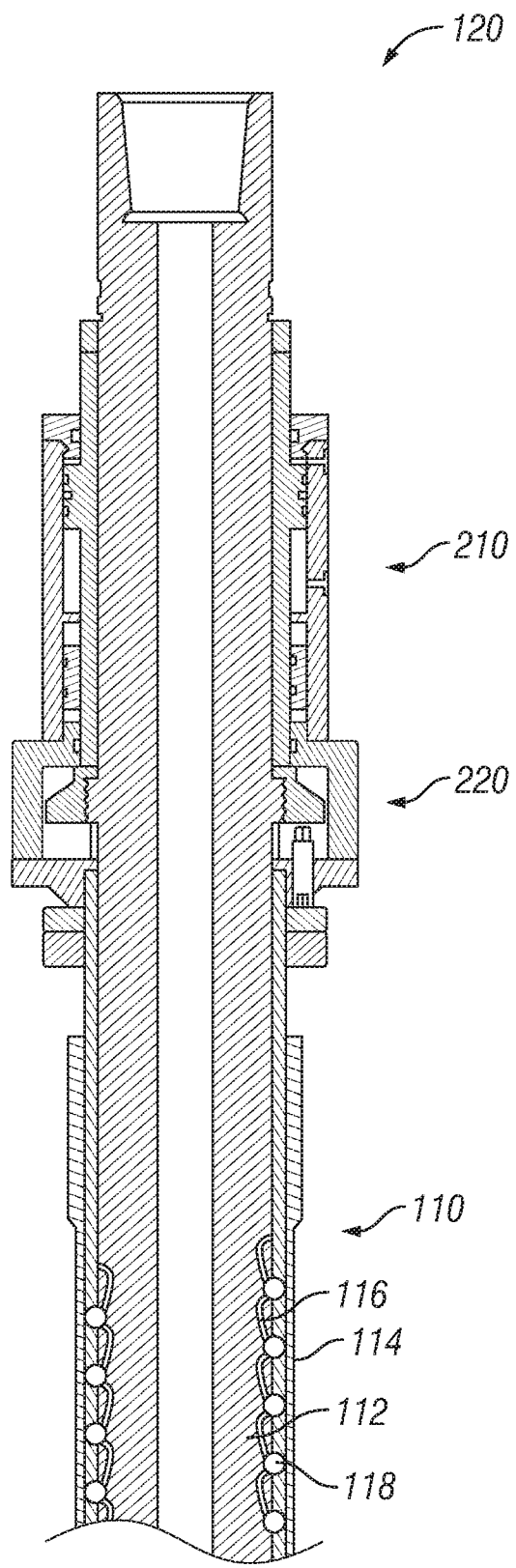
FIG. 1 illustrates a section view of an embodiment of an actuator device with integrated torque turn monitoring.

Embodiments disclosed herein relate to a hydraulic actuator assembly with integrated torque turn monitoring. Some embodiments include an outer hydraulic section which is rotationally fixed and an inner hydraulic section at an upper end with integrated torque turn monitoring features disposed within the inner hydraulic section. Certain embodiments additionally include a gripping apparatus, actuated by the inner hydraulic section at a lower end. The complete hydraulic actuator assembly is connectable to a top drive and may be used to grip the tubular OCTG from the inside. A rig operator may use existing rig equipment, such as a transfer elevator, to pick up and position a first tubular OCTG above a second tubular OCTG already secured in the rotary table on the drill floor. The operator may then use the hydraulic actuator assembly to grip the first tubular OCTG and use the rotational capability of the top drive to couple the two joints of tubular OCTG together, that is "make up." Similarly, the rotational capability of the top drive may be used to decouple two joints of tubular OCTG, that is "break out." The hydraulic actuator assembly includes a rotationally fixed outer hydraulic section, an inner hydraulic section with integral torque turn monitoring capabilities, and a gripping apparatus which is actuated by the inner hydraulic section to grip tubular OCTG. The outer hydraulic section may be rotationally fixed using an anti-rotation bracket. In some embodiments, the anti-rotation bracket is connected to a pipe-handler in order to prevent rotation. The inner hydraulic section may be passively rotated but does not include a device for actively controlling its own rotation. The inner hydraulic section is rotationally fixed relative to the inner mandrel which may be rotated directly or indirectly by the top drive. A portion of the inner mandrel extends axially through the inner hydraulic section which is contained within the outer hydraulic section. In a preferred embodiment, the integral torque turn monitoring components comprising a data acquisition device, power source (located at 500 in FIG. 3), and wireless transmitter (located at 600 in FIG. 3) are located within a torque sub ring which is mounted to a portion of the inner mandrel and housed within the inner hydraulic section.

The outer hydraulic section of the actuator assembly is typically rotationally stationary, however the inner hydraulic section with integrated torque turn monitoring may rotate independently of the outer hydraulic section.

The gripping apparatus generally includes a first member (e.g., a probe or inner mandrel) having a plurality of indentations formed in an outer surface. Each indentation has an inclined surface angled relative to a longitudinal axis of the first member. The gripping apparatus further includes a second member (e.g., an outer cage) concentrically disposed relative to the first member. The second member has a plurality of openings through which a plurality of rolling supports disposed within respective indentations of the first member may protrude. Movement of the second member relative to the first member urges the rolling supports along the inclined surfaces of indentations of the first member. Operating the hydraulic actuator causes relative movement of the outer cage with respect to the inner mandrel to cause the rolling supports to move along the inclined surfaces of the indentations. The rolling supports are configured to protrude at least partially from the openings in the outer cage and engage the OCTG tubular. Thereafter, rotational torque may be applied by the top drive (not shown) to connect the tubular to its respective partner secured in the rotary table. A related device has been described in detail by, for example, U.S. patent application Ser. No. 13/980,769, which is incorporated by reference herein in its entirety.

In one embodiment the disclosed hydraulic actuator includes a series of hydraulic or pneumatic fluid chambers, which when filled with fluid move the outer cage relative to the inner mandrel. A sleeve is fixed at its upper end and lower end about an outer surface of the inner mandrel. The fixed sleeve is configured having an outer circumferential flange protruding radially outward. Alternatively, a circumferential flange may be integrally disposed on the inner mandrel itself. A movable outer hydraulic section includes an outer housing attached between an upper end cap at an upper end and a hub assembly at a lower end. The hub assembly is a portion of the inner hydraulic section. The movable outer housing is disposed concentrically about the fixed sleeve and/or flange. The upper end cap and the hub assembly sealingly engage an outer surface of the fixed sleeve, and the outer housing sealingly engages an outer surface of the flange of the fixed sleeve.

The hub assembly disposed at a lower end of the outer movable housing engages the outer cage and is capable of moving the outer cage to travel axially relative to the movement of the inner mandrel. A bump stop ring is attached by fasteners to a lower portion of the hub assembly. The bump stop ring includes two plates fastened together—an upper steel plate and a lower shock-absorbing plate made from a shock-absorbing material such as carbon fiber. A mandrel ring is fixed to the inner mandrel and engages a lower end of the fixed sleeve. The mandrel ring is configured to limit axial movement of the hub assembly 130 along the length of the inner mandrel.

An upper chamber is defined above the flange on the fixed sleeve and below the upper end cap, and between the outer surface of the fixed sleeve and the inner surface of the movable outer housing. A lower chamber is defined below the flange on the fixed sleeve and above the hub assembly, and between the outer surface of the fixed sleeve and the inner surface of the movable outer housing. An upper port extends radially through the movable outer housing and provides fluid communication into the upper chamber. A lower port extends radially through the movable outer housing and provides fluid communication into the lower chamber. The upper port and the lower port may each be fitted with a pilot operated check valve configured to be closed to prevent fluid from exiting the upper chamber and lower pressure, respectively.

In certain embodiments, a floating piston may be disposed in the lower chamber and is configured to move axially therein. A gas chamber may be defined below the floating piston and above the hub assembly, and between the outer surface of the fixed sleeve and the inner surface of the movable outer housing. The gas chamber may be filled or pre-charged with a gas or gas mixture—such as nitrogen or similar gases—at a certain pressure. For example, the gas chamber may be pre-charged to a pressure of at least 500 pounds per square inch (psi), or at least 1,000 psi, or at least 1,500 psi, or greater. A floating piston stop, configured as a radially inwardly protruding lip, may be disposed on an inner surface of the movable outer housing configured to limit upward movement of the floating piston.

FIG. 1 illustrates a section view of an embodiment of an actuator with integrated torque turn monitoring. The gripping apparatus 110 includes a first member 112 (e.g., a probe or inner mandrel) having a plurality of indentations 116 formed in an outer surface. Each indentation 116 has an inclined surface angled relative to a longitudinal axis of the first member 112. The gripping apparatus 110 further includes a second member 114 (e.g., an outer cage) concentrically disposed relative to the first member 112. The second member 114 has a plurality of openings through which a plurality of rolling supports 118 disposed within respective indentations 116 of the first member 112 may protrude. Movement of the second member 114 relative to the first member 112 urges the rolling supports 118 along the inclined surfaces of indentations 116 of the first member 112. Operating the actuator assembly 120 in a manner described herein causes relative movement of the outer cage 114 with respect to the inner mandrel 112 to cause the rolling supports 118 to move along the inclined surfaces of the indentations 116. The rolling supports 118 are configured to protrude at least partially from the openings in the outer cage 114 and engage the OCTG tubular. Once the gripping apparatus 110 has engaged the tubular, rotational torque may be applied by the top drive (not shown) to connect the tubular to a tubular secured in the rotary table.

Figure 2:
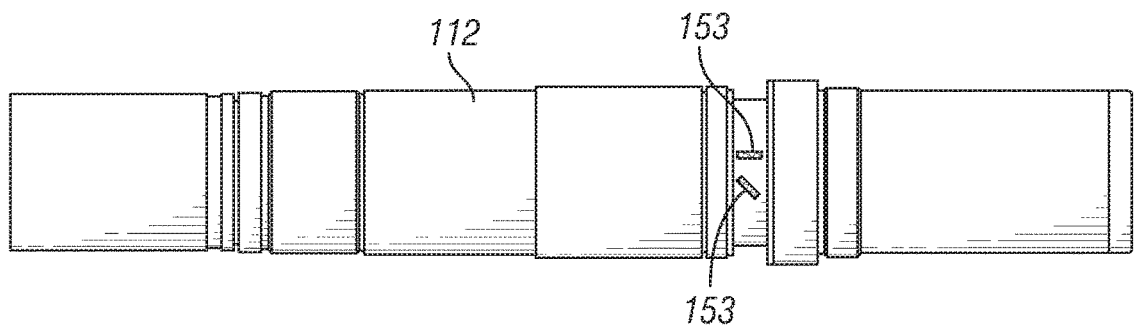
FIG. 2 illustrates a view of an embodiment of a torque load and axial load sensor.
Figure 3:
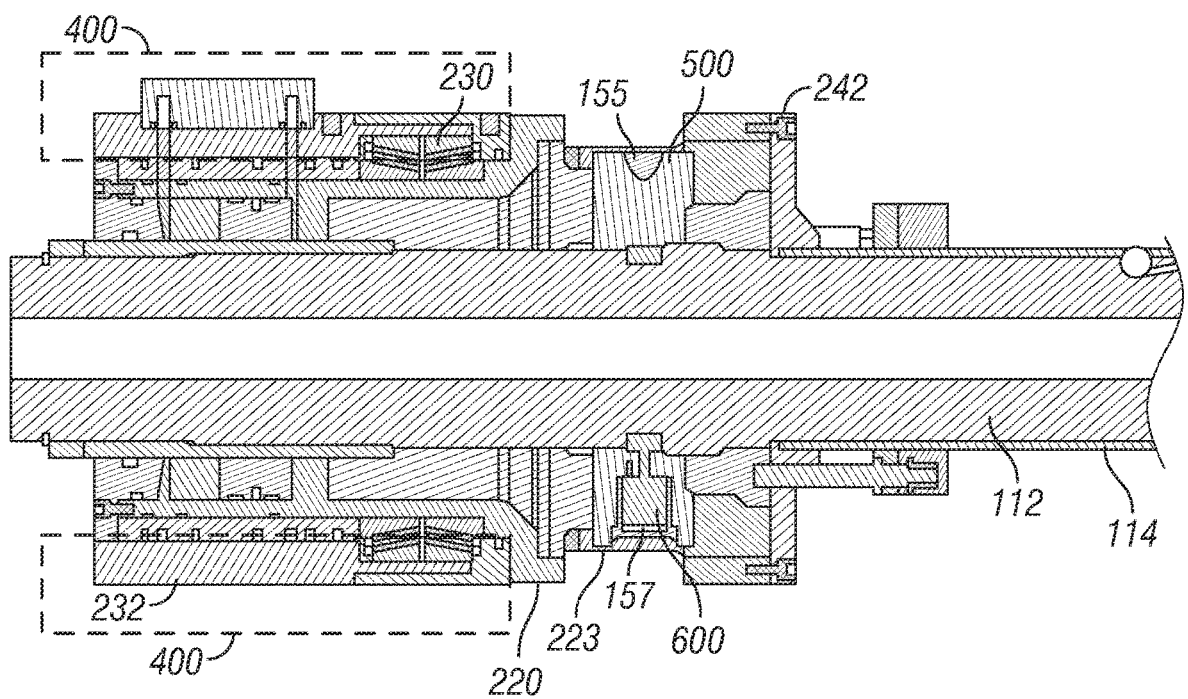
FIG. 3 illustrates an enlarged section view of an embodiment of an actuator.

As shown in FIG. 2, integrated axial load or torque load sensors 153 are housed in a groove on the inner mandrel 112. As shown in FIG. 3, rotational speed sensor 155 is housed on a ring 223 within the inner hydraulic section 220. The inner hydraulic section 220 including the hub assembly 130, torque ring 223, axial and torque load sensors 153 and rotational speed sensor 155 and gripping apparatus 110 are all rotationally fixed with each other. Additionally, these components are rotationally independent from the outer hydraulic section 210 which as described above.

In some embodiments, sensor 153 is a strain gauge. The strain gauge may be axially aligned with the inner mandrel 112 in order to measure axial load or be oriented at about 45 degrees off of the inner mandrel axis to measure torque load. Wires connected to the strain gauges run through a channel to a data acquisition device 157 housed within the inner hydraulic section. In some embodiments the data acquisition device 157 is powered by a battery and transmits measurement readings using a wireless transmitter. This arrangement allows for torque load and/or axial load monitoring to be entirely integrated into the actuator assembly, and in some embodiments into the inner hydraulic section. Complete integration of the torque turn monitoring is allowed by building the sensors and related components into the freely rotating inner hydraulic section and inner mandrel. Rotational speed sensor 155 is similarly built into the inner hydraulic sensor. In some embodiments, the rotational speed sensor 155 is a gyroscope sensor and is connected by physical wires to the data acquisition device 157. In some embodiments, the data acquisition device wirelessly transmits measurement readings to a computer.

Figure 4A:
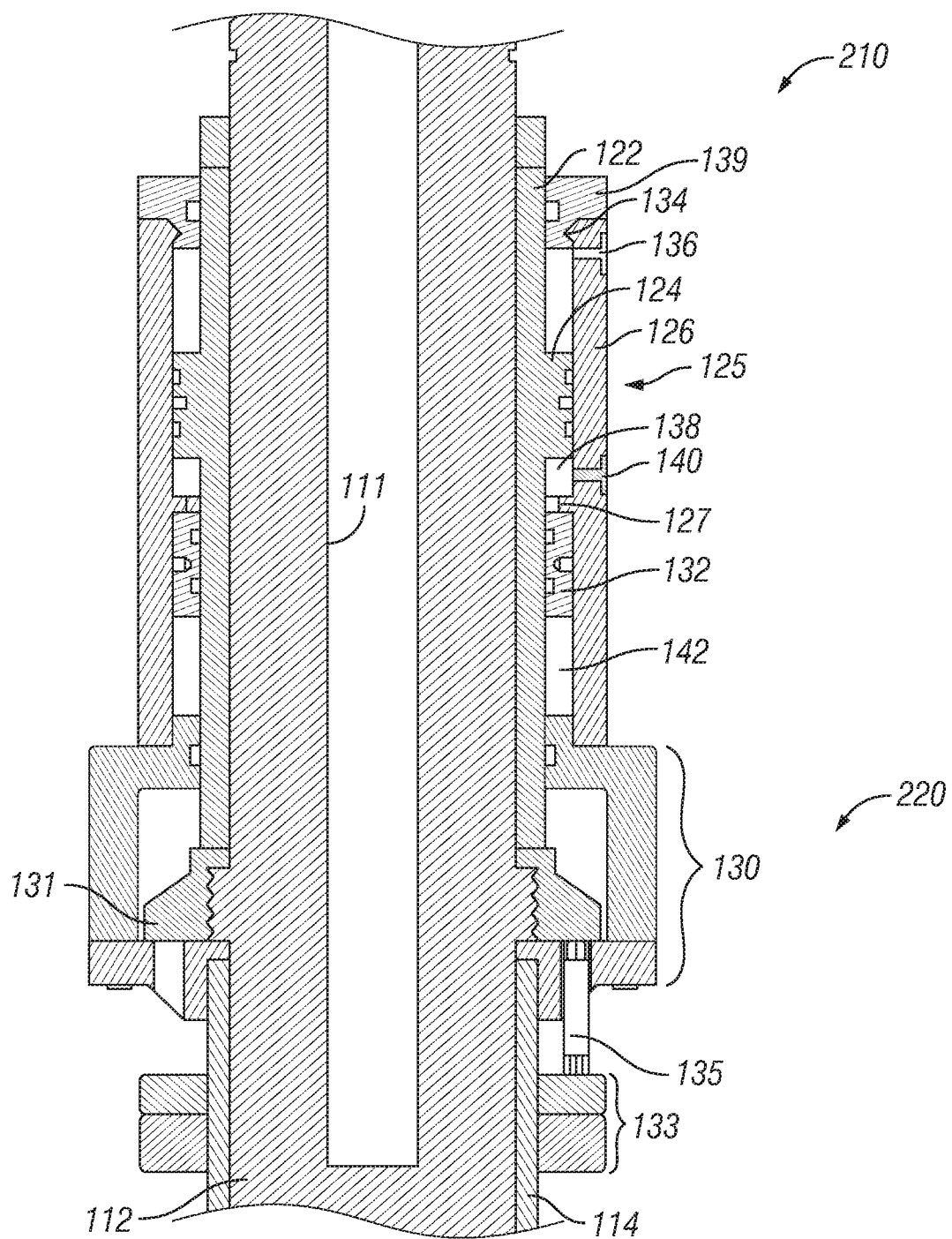
FIG. 4A illustrates an enlarged section view of an embodiment of an actuator assembly in an unset position.
Figure 4B:
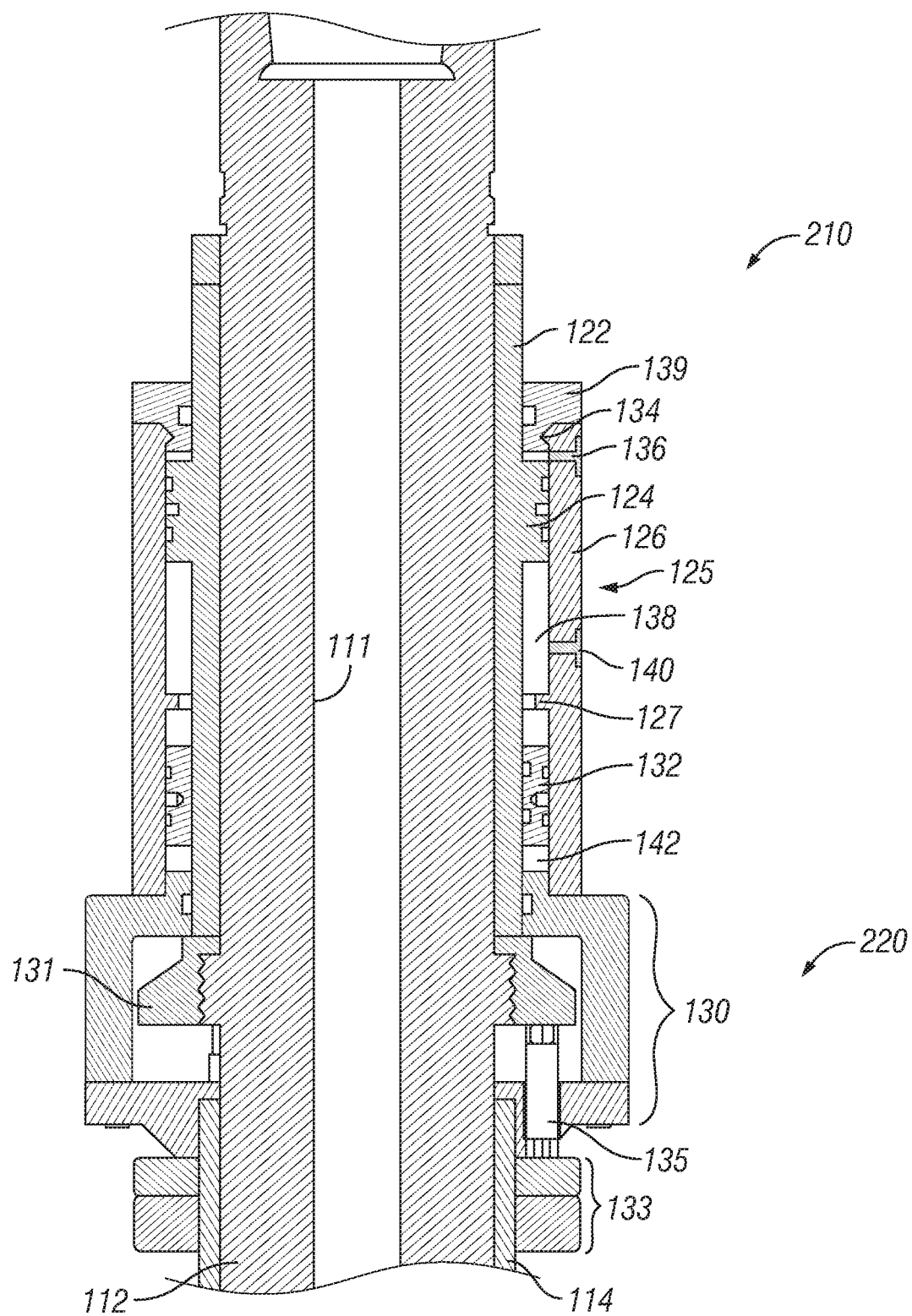
FIG. 4B illustrates an enlarged section view of an embodiment of an actuator assembly in a set position.

FIGS. 4A and 4B illustrate enlarged section views of an embodiment of an actuator assembly including both the outer hydraulic section 210 and inner hydraulic section 220. FIG. 4A illustrates the actuator assembly in an unset position. FIG. 4B illustrates the actuator assembly in a set position. The inner mandrel 112 of the actuator device extends axially through the inner hydraulic section 220 and outer hydraulic section 210. The inner mandrel 112 is configured to rotate independently of the outer housing assembly 125 of the outer hydraulic section 210 and in unison with the inner hydraulic section 220. The inner mandrel 112 includes a central through bore 111 that extends axially there through to allow drilling fluid or mud to be pumped into the tubular OCTG and/or well bore. The actuator assembly 120 includes a series of hydraulic or pneumatic fluid chambers which, when alternately filled with fluid, directly move the outer cage 114 relative to the inner mandrel 112. A sleeve 122 is fixed at an upper end and lower end about an outer surface of the inner mandrel 112. The fixed sleeve 122 is configured having an outer circumferential flange 124 protruding radially outward. A movable outer housing assembly 125 includes an outer housing 126 attached between an upper end cap 129 at an upper end and a hub assembly 130 at a lower end. The movable outer housing assembly 125 is disposed concentrically about the fixed sleeve 122 and flange 124. The upper end cap 129 and hub assembly 130 sealingly engage an outer surface of the fixed sleeve 122, and the outer housing 126 sealingly engages an outer surface of the flange 124 of the fixed sleeve 122. This sealing engagement allows for rotation of the inner hydraulic section components, such as the hub assembly) to rotate while the outer hydraulic section, including the outer housing assembly 125 does not. A bearing spacer 232 includes at least one seal which prevent hydraulic fluid from leaking throughout the system even while under rotation. Bearing 230 between the outer hydraulic section and inner hydraulic section allows the independent rotation of the inner hydraulic section while the outer hydraulic section is kept rotationally fixed using an anti-rotation bracket. Due to the nature of the disclosed actuation, bearing 230 is not subject to significant axial forces as the outer and inner hydraulic sections are axially fixed relative to each other. The entire actuator assembly 120 including both inner and outer hydraulic sections translates at a whole with respect to the inner mandrel 112. This allows for a significantly increased operational life of the bearing 230.

The hub assembly 130 disposed at a lower end of the outer housing 126 is coupled either directly or indirectly to the outer cage 114 and is capable of moving the outer cage 114 to travel axially relative to the movement of the inner mandrel 112. In many embodiments, the hub assembly 130 is connected to the outer cage 114 using a cage ring 242 as shown in FIG. 3. A bump stop ring 133 secured or fixed to an outer surface of the outer cage 114 is attached by a plurality of fasteners 135 to a lower portion of the hub assembly 130. The bump stop ring 133 includes two plates fastened together—an upper steel plate and a lower shock-absorbing plate made from a shock-absorbing material such as carbon fiber or similar materials. A mandrel ring 131 is secured or fixed to an outer surface of the inner mandrel 112 and engages a lower end of the fixed sleeve 122. The mandrel ring 131 is configured to limit axial movement of the hub assembly 130 along the length of the inner mandrel 112.

Referring still to FIGS. 4A and 4B, an upper chamber 134 is defined above the flange 124 on the fixed sleeve 122 and below the upper end cap 129, and between the outer surface of the fixed sleeve 122 and the inner surface of the movable outer housing 126. A lower chamber 138 is defined below the flange 124 on the fixed sleeve 122 and above the hub assembly 130, and between the outer surface of the fixed sleeve 122 and the inner surface of the movable outer housing 126. An upper port 136 extends radially through the movable outer housing 126 and provides fluid communication into the upper chamber 134. A lower port 140 extends radially through the movable outer housing 126 and provides fluid communication into the lower chamber 138. The upper port 136 and the lower port 140 may each be fitted with a pilot operated check valve configured to be closed to prevent fluid from exiting the upper chamber and lower pressure, respectively.

A floating piston 132 is disposed in the lower chamber 138 and is configured to move axially therein. A gas chamber 142 is defined below the floating piston 132 and above the hub assembly 130, and between the outer surface of the fixed sleeve 122 and the inner surface of the movable outer housing 126. The gas chamber 142 may be filled or pre-charged with a gas or gas mixture—such as nitrogen or similar gases—at a certain pressure. A floating piston stop 127, configured as a radially inwardly protruding lip, is illustrated disposed on an inner surface of the movable outer housing 126 configured to limit upward movement of the floating piston 132.

Methods of operating the disclosed actuator assembly 120 described herein include pumping fluid through the lower pressure port 140 and into the lower chamber 138, thereby moving the outer housing assembly 125 in an axial direction downward. In turn, the outer cage 114 is moved downward relative to the inner mandrel 112, and rolling supports 118 are moved simultaneously in axial and radial directions along inclined surfaces of the indentations 116, thereby protruding through openings in the outer cage 114 to engage the tubular OCTG. In some embodiments, pumping fluid through the lower pressure port 140 also forces the floating piston 132 in an axial direction downward, thereby compressing gas therein and pressurizing the gas chamber 142. Once the desired fluid pressure has been reached in the lower chamber 138, fluid ceases to be pumped into the lower chamber 138, which remains pressurized at the desired pressure level due to the closed pilot operated check valve in the lower pressure port 140. The compressed gas in the gas chamber 142 directly acts upon the lower surface of the floating piston 132, upwardly urging the floating 132 piston and providing a continuous set pressure in the lower chamber 138. Moving the outer cage 114 to disengage the rolling supports from the tubular OCTG includes opening the pilot operated check valve in the lower pressure port 140, and pumping fluid through the upper pressure port 136 and into the upper chamber 134, thereby moving the outer housing assembly 125 upward.

Embodiments of the disclosed actuator may include a safety control system configured to monitor the set and unset hydraulic or pneumatic pressures present at any given time in the upper and lower chambers, and thereby the position of the rolling supports. The safety control system is also able to monitor feedback loops that include sensors or monitors located to monitor pressures in the upper and lower chambers, and located at other pressure locations. The safety control system may include a processor to collect data readings from the various sensors such as the axial and torque load sensors 153 and rotational speed sensor 155. A wireless communication link may be used to transmit pressure data readings from the safety control system processor to an operator. In some embodiments the safety control system may additionally and/or alternatively transmit torque load and rotational speed data to an operator and/or to a system processor. In certain embodiments, a system processor is operably connected to a machine control system such that the machine control system may alter the operations of the top-drive or other equipment in response to torque load and/or rotational speed measurements.

Advantageously, embodiments described herein provide a actuator assembly with minimal moving components to provide greater efficiency and torque monitoring capability. The actuator assembly removes components required in current systems, including separate hydraulic or pneumatic lines and systems, separate and/or additional torque monitoring tools, and a remote control console for operating the hydraulic or pneumatic systems. Rather, the present embodiments have hydraulic or pneumatic chambers, torque load sensors, and rotational speed sensors built directly into the actuator.

Disclosed embodiments operate without the assistance of a separate torque turn monitoring tool and in the absence of a separate or otherwise non-integral torque load sensor. The integral nature of the disclosed embodiments eliminates the need for a separate and/or additional mandrel other than the inner mandrel which, in disclosed embodiments grips tubular sections and simultaneously houses the disclosed strain gauges in a groove of the mandrel. It will be appreciated that the use of a single mandrel and integral torque turn monitoring eliminates the need for a separate torque turn monitoring tool.

The actuator assembly with integrated torque turn monitoring described herein may be used in a number of places. First, as primarily described herein, the actuator may be used in the construction of oil and gas wells where it is usually necessary to drill and line the well bore with a string of steel pipes, or OCTG tubulars. Other oil and gas applications may include abandonment or decommissioning of oil and gas wells where it is usually necessary to remove OCTG tubulars, steel structures, pilings, caissons, or pipelines. Yet other applications may include installing anchoring connector systems for offshore drilling establishments. For example, floating drilling rigs in the form of semi-submersibles, spars, and drill ships are often used in deep water drilling activities. These drilling rigs must be anchored or tethered to the sea floor using large suction anchors deployed and placed on the sea floor to remain in position. Large ropes or chains are then attached from the drilling rig to the suction anchors. Yet another application may be in the recovery of damaged or abandoned pipelines from the sea floor. Yet other applications may be in the placement of columns for wind energy turbines. Still other applications may be in the erection of structures fabricated from tubular members such as offshore platforms, water towers, etc.

Disclosed embodiments relate to a hydraulic actuator with integral torque turn monitoring comprising an outer hydraulic section comprising a housing assembly, wherein at least a portion of the outer hydraulic section is rotationally fixed which section is shown at 400 in FIG. 3; an inner hydraulic section comprising a strain gauge, a gyroscope, and a gripping apparatus comprising an outer cage concentrically disposed about an inner mandrel and movable relative to the inner mandrel for engaging and disengaging a plurality of rolling supports within a tubular, wherein the housing assembly is coupled to the outer cage and is axially movable relative to the inner mandrel and an upper fluid chamber disposed between the housing assembly and the inner mandrel, and a lower fluid chamber disposed between the housing assembly and the inner mandrel, wherein fluid pumped through a lower pressure port into the lower chamber moves the housing assembly in a first direction thereby causing the gripping apparatus to engage the tubular, and wherein fluid pumped through an upper pressure port into the upper fluid chamber moves the housing assembly in a second direction thereby causing the gripping apparatus to disengage the tubular, and wherein the inner hydraulic section is rotationally independent of the outer hydraulic section. In some embodiments, the inner housing assembly further comprises a data acquisition device, a power source, and a wireless transmitter; the strain gauge is disposed within a groove on the inner mandrel; the power source is a battery; and/or the housing assembly is coupled to the outer cage by a cage ring.

Some embodiments further comprise a sleeve fixed to the inner mandrel, the sleeve comprising an outer circumferential flange protruding radially outward to sealingly engage the housing assembly. In certain embodiments, the housing assembly comprises an outer housing attached between an upper end cap at an upper end and a hub assembly at a lower end; the upper fluid chamber is axially defined between the flange on the sleeve fixed to the inner mandrel and the upper end cap, and radially between the outer surface of the fixed sleeve and the inner surface of the movable outer housing; and/or the lower fluid chamber is axially defined between the flange on the sleeve fixed to the inner mandrel and the hub assembly, and radially between the outer surface of the fixed sleeve and the inner surface of the movable outer housing Some embodiments further comprise a mandrel ring secured to the inner mandrel proximate to a lower end of the sleeve fixed to the inner mandrel, wherein the mandrel ring is configured to limit axial movement of the housing assembly along the length of the inner mandrel; moving a floating piston disposed within the lower fluid chamber in the first direction and thereby compressing a gas present in a gas chamber disposed between the housing assembly and the inner mandrel and below the floating piston; and/or pumping fluid into the lower fluid chamber and moving the housing assembly axially relative to the inner mandrel in a second direction thereby causing the gripping apparatus to disengage the tubular.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A hydraulic actuator with integral torque turn monitoring comprising:
   an outer hydraulic section comprising a housing assembly, wherein at least a portion of the outer hydraulic section is rotationally fixed;
   an inner hydraulic section comprising a strain gauge, a gyroscope, and a gripping apparatus comprising an outer cage concentrically disposed about an inner mandrel and movable relative to the inner mandrel for engaging and disengaging a plurality of rolling supports within a tubular, wherein the housing assembly is coupled to the outer cage and is axially movable relative to the inner mandrel;
   an upper fluid chamber disposed between the housing assembly and the inner mandrel, and a lower fluid chamber disposed between the housing assembly and the inner mandrel, wherein fluid pumped through a lower pressure port into the lower chamber moves the housing assembly in a first direction thereby causing the gripping apparatus to engage the tubular, and wherein fluid pumped through an upper pressure port into the upper fluid chamber moves the housing assembly in a second direction thereby causing the gripping apparatus to disengage the tubular, and wherein the inner hydraulic section is rotationally independent of the outer hydraulic section.

2. The hydraulic actuator of claim 1, wherein the inner hydraulic section further comprises a data acquisition device operably connected to a power source and a wireless transmitter, and wherein the data acquisition device is operably connected to the strain gauge and gyroscope.

3. The hydraulic actuator of claim 2, wherein the power source is a battery.

4. The hydraulic actuator of claim 1, wherein the strain gauge is disposed within a groove on the inner mandrel.

5. The hydraulic actuator of claim 1, wherein the housing assembly is coupled to the outer cage by a cage ring.

6. The actuator assembly of claim 1, further comprising a sleeve fixed to the inner mandrel, the sleeve comprising an outer circumferential flange protruding radially outward to sealingly engage the housing assembly.

7. The actuator assembly of claim 6, wherein the housing assembly comprises an outer housing attached between an upper end cap at an upper end and a hub assembly at a lower end.

8. The actuator assembly of claim 7, wherein the upper fluid chamber is axially defined between the flange on the sleeve fixed to the inner mandrel and the upper end cap, and radially between the outer surface of the fixed sleeve and the inner surface of the movable outer housing.

9. The actuator assembly of claim 7, wherein the lower fluid chamber is axially defined between the flange on the sleeve fixed to the inner mandrel and the hub assembly, and radially between the outer surface of the fixed sleeve and the inner surface of the movable outer housing.

10. The actuator assembly of claim 1, further comprising a mandrel ring secured to the inner mandrel proximate to a lower end of the sleeve fixed to the inner mandrel, wherein the mandrel ring is configured to limit axial movement of the housing assembly along the length of the inner mandrel.

* * * * *